Oct. 8, 1957 J. G. BOOTH ET AL 2,808,725
DIFFERENTIAL PRESSURE MEASURING APPARATUS
Filed Sept. 26, 1951 4 Sheets-Sheet 3
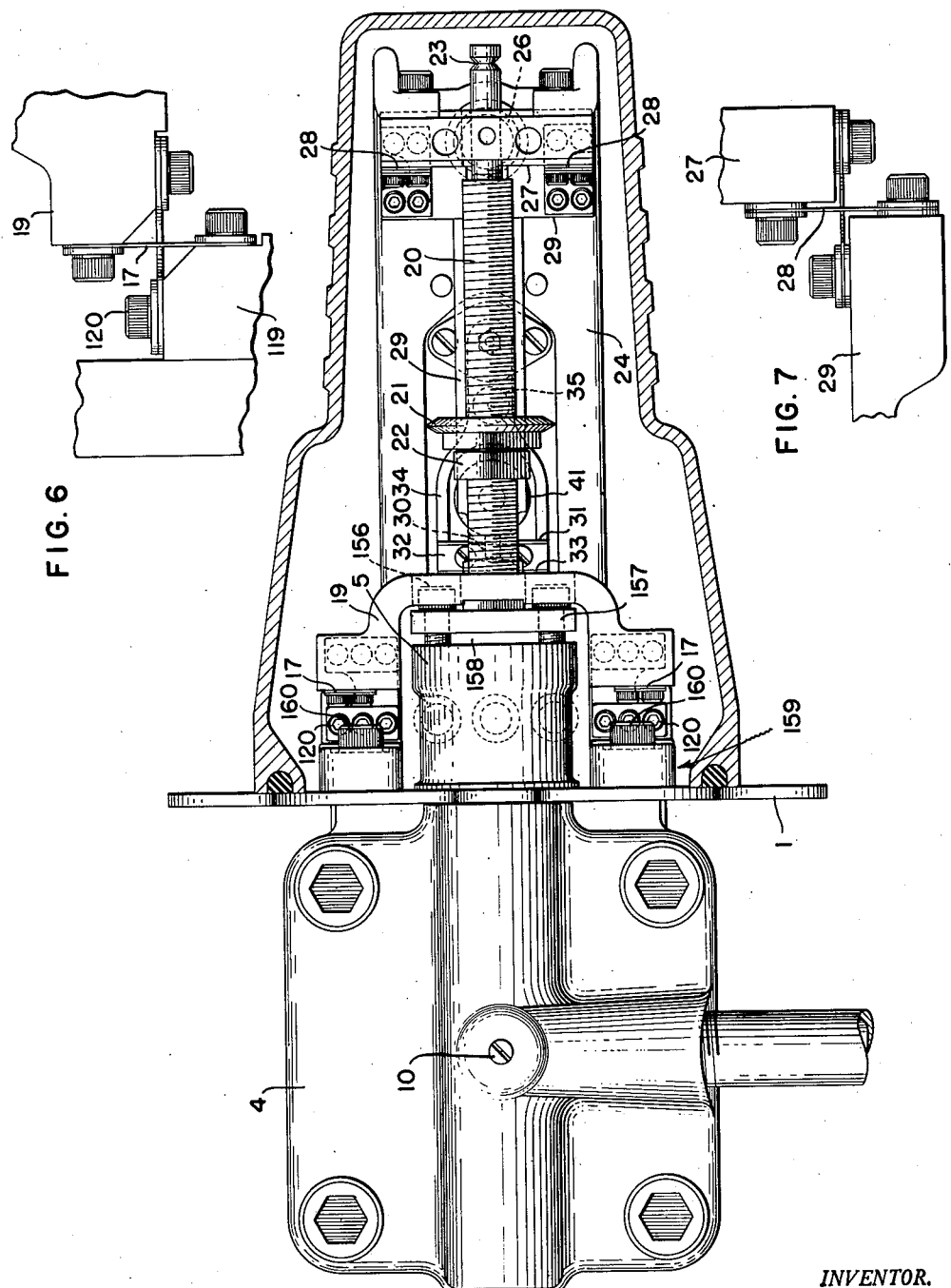
INVENTOR.
JOHN G. BOOTH
ROBERT C. DUBOIS
BY CHARLES E. WEST
ATTORNEY.

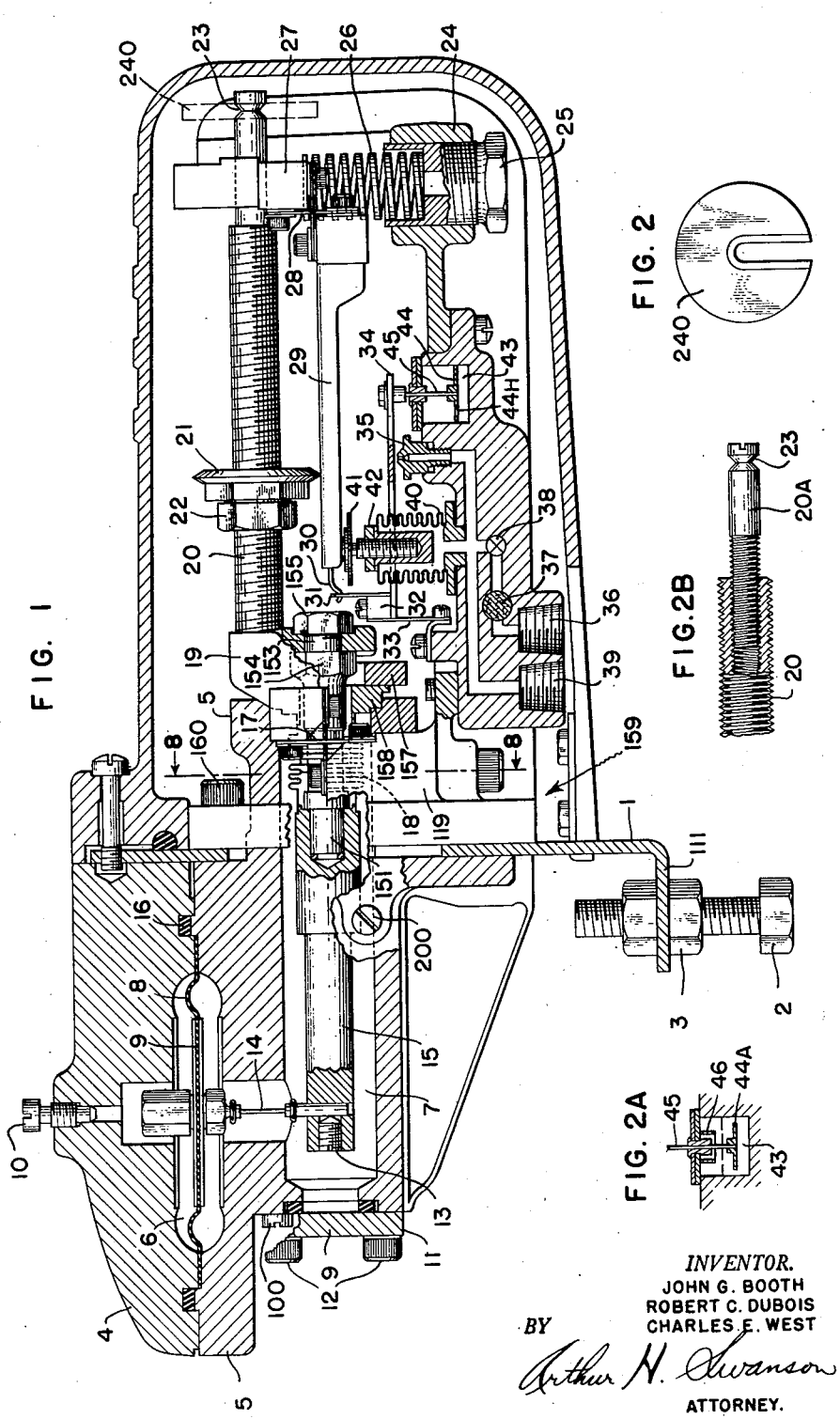

Oct. 8, 1957   J. G. BOOTH ET AL   2,808,725
DIFFERENTIAL PRESSURE MEASURING APPARATUS
Filed Sept. 26, 1951   4 Sheets-Sheet 4

INVENTOR.
JOHN G. BOOTH
ROBERT C. DUBOIS
CHARLES E. WEST
BY
*Arthur H. Swanson*
ATTORNEY.

United States Patent Office 2,808,725
Patented Oct. 8, 1957

2,808,725
DIFFERENTIAL PRESSURE MEASURING APPARATUS

John G. Booth, Robert Clark Du Bois, and Charles E. West, Philadelphia, Pa., assignors to Minneapolis-Honeywell Regulator Company, Minneapolis, Minn., a corporation of Delaware Application September 26, 1951, Serial No. 248,358

4 Claims. (Cl. 73—406)

This invention relates to an instrument for measuring a differential pressure, such as that caused by a fluid flowing through an orifice, and for transmitting a measurement proportional to this pressure pneumatically to an indicator or controller.

It is an object of this invention to provide a differential-pressure-responsive measuring and transmitting instrument which has a fast speed of response; which contains no mercury (so that leaks, contamination of product, emulsification and inconvenience are eliminated); which requires no seal pots or condensing chambers in most instances; which reduces or eliminates purging; in which the range is easily changed and the meter is simply calibrated; which is protected against excess pressures; which is weather-proof; which can be simply and quickly installed and conveniently mounted; which contains differential pressure chambers which are easily vented and drained; which can be readily serviced; and which contains friction-free bearings forming fulcrums.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a longitudinal, vertical, cross section of a differential-pressure-operated measuring instrument with pneumatic transmission.

Fig. 2 is an elevation of a calibrating weight.

Fig. 2A is a longitudinal, vertical, cross section of a portion of the instrument showing a modified form of dashpot.

Fig. 2B is a longitudinal, vertical, cross section of a portion of the instrument showing the suspension for a calibrating weight.

Fig. 5 is a top or plan view with the casing broken away in horizontal cross section.

Fig. 6 is a partial, side elevation on an enlarged scale of the pivot for the primary beam.

Fig. 7 is a partial, side elevation on an enlarged scale of the pivot for the secondary beam.

Figure 3:
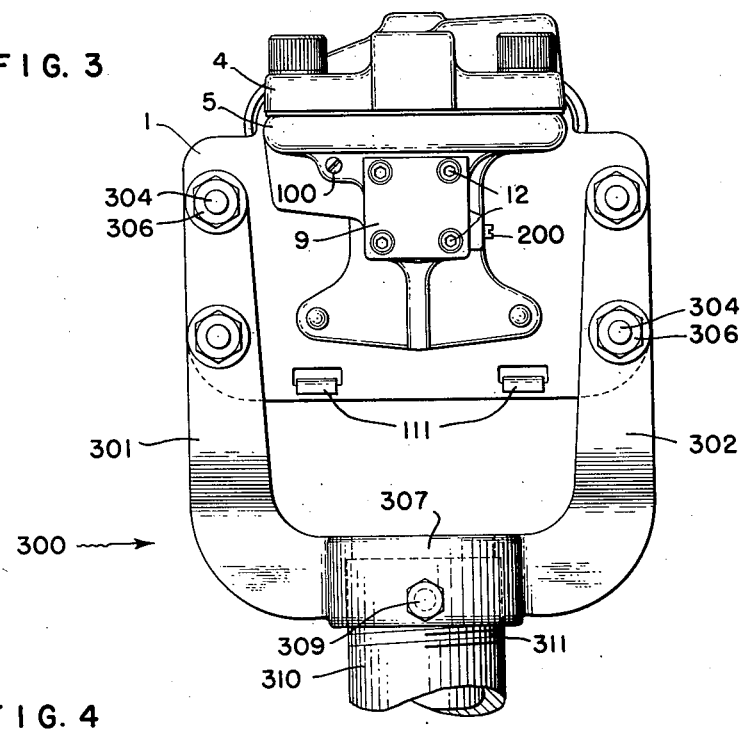
Fig. 3 is a left end view of the instrument showing a modification of a supporting bracket.
Figure 4:
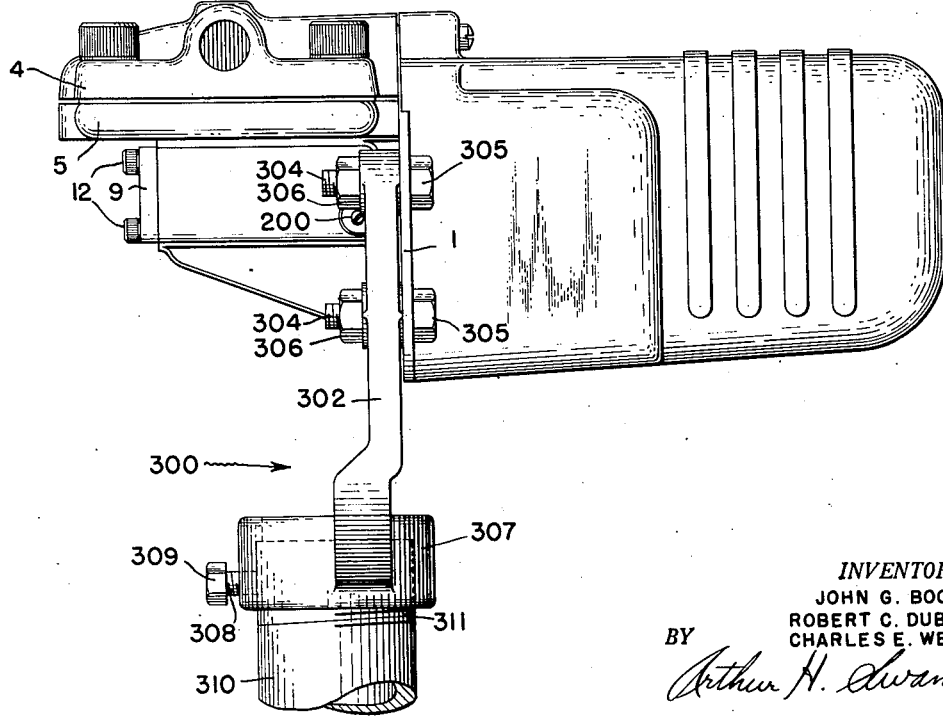
Fig. 4 is a side view of the instrument and the bracket shown in Fig. 3.

Fig. 1 shows a differential-pressure-operated measuring instrument which may be used to measure flow or other differential pressure and which incorporates a pneumatic transmitter and a pneumatic force balance mechanism. This meter may be mounted on a panel, bracket, or pipe stand yoke by means of a support 1 which is a flat strip of substantially L-shape in longitudinal cross section having a flange 111 and also having perforations through it. A hexagonal headed screw 2 and two locking nuts 3 provide means for attaching support 1 to its mounting. The meter body has a top plate 4 and a bottom plate 5 which are recessed to provide an upper, low-pressure chamber 6 and a lower, high-pressure chamber 7. These plates and the remainder of the meter body and its trim may be made of stainless steel or carbon steel and are strong enough to withstand a pressure of 750 or 1500 pounds per square inch.

Separating the low pressure chamber 6 and the high pressure chamber 7 is a resilient diaphragm 8 which is more corrosion-resistant than stainless steel.

Low pressure chamber 6 may be provided with a screw 10 which is removable to vent fluid from the low pressure chamber. High pressure chamber 7 may be provided with a similar screw 100 forming a fluid vent and with a second screw 200 forming a drain for liquid from the high pressure chamber.

The top plate 4 is so arranged that it may be connected to the bottom plate 5 in either of two positions so that the connection to the low pressure chamber 6 is either at the same side as or is 180° opposite to the connection to the high pressure chamber 7. The movement of diaphragm 8 is negligible during normal operation but chambers 6 and 7 provide relatively large clearance on each side of diaphragm 8. This clearance is about ¼ inch and prevents the meter going out of service or operating improperly if small, solid particles lodge between the diaphragm and the meter body. This clearance also eliminates the need for filters in the taps which conduct the pressures to chambers 6 and 7 and thus eliminates considerable maintenance.

Connected to the left side of lower plate 5 is a plate 11 held in place by four similar bolts 12 (of which but two are seen in Fig. 1). Plate 11 is readily removable and provides access to a locking screw 13 which secures the diaphragm connecting rod 14 to the bellows rod assembly 15 which forms part of the primary beam hereinafter described.

Low pressure chamber 6, high pressure chamber 7, and diaphragm 8 are sealed by means of a chamber gasket 16. Gasket 16 may be a ring of rectangular section and made of rubber or other conventional material as shown in the drawing. Preferably, however, gasket 16 is constructed from a thin strip of stainless steel, V-shaped in cross section and wound in a ring alternately with strip asbestos. Gasket 16 is lodged in a groove in the top plate 4 and is stressed by a ring projecting from bottom plate 5 so that its V-shape causes it to hold a tight seal. Gasket 16 is truly reusable and is not damaged even if the meter body is disassembled and reassembled many times.

The primary beam of which the bellows rod assembly 15 is a part is pivoted by means of a fulcrum formed of two flat strips 17 of spring steel at right angles to each other. Such a bearing or fulcrum or flexure mounting is free from friction and requires no maintenance.

The primary beam, which is pivoted on springs 17, emerges from the high pressure chamber 7 through a sealing bellows 18. Bellows 18 and assembly 15 are connected to a yoke 19 which supports a screw 20 on which is screw-threadedly supported rider 21 secured in position by a nut 22 forming a span lock.

At the right end of screw 20 is located a groove 23 which locates an exact point for hanging a calibration weight 240.

The meter body also includes a stationary part 24 in which is screw-threadedly mounted a nut 25 which serves to adjust the pressure on the lower end of an overload spring 26 whose upper end supports a relatively stationary plug 27 on which is mounted a second pair of flat strips of spring steel at right angles to each other which form a pivot or fulcrum 28 for the secondary beam 29. Beam 29 carries at its left end a hook 30 which passes through a perforation in a plate 31 which cooperates with a block 32 and a second plate 33 to form a flexible pivot for a flapper 34.

Flapper 34 cooperates with a nozzle 35 which is supplied with air from a supply conduit 36 containing a filter 37 and a fixed restriction 38. The distance between flapper 34 and nozzle 35 thus governs the air pressure in a conduit terminating in an outlet port 39 from whence the air may be transmitted by suitable conduits to an air-operated indicator or controller which may be located at any convenient place preferably not more than 300 feet away.

The conduit between nozzle 35 and port 39 also communicates with a feedback bellows 40 which operates flapper 34 by means of engagement between bellows 40 and secondary beam 29. Between feedback bellows 40 and secondary beam 29 is located a zero adjustment comprising a knurled wheel 41 and a hexagonal locking nut 42.

At the free end of flapper 34 is located a dashpot comprising a cylindrical chamber 43 in which rides a piston 44 having one or more perforations 44H through it and attached to the free end of flapper 34 by a piston rod 45. The cylindrical chamber 43 is adapted to contain a relatively viscous liquid such as oil. The viscosity of this liquid remains relatively constant with wide changes in ambient temperature. The dashpot is non-spill and maintenance-free.

Modifications

Fig. 2A shows a modified form of dashpot in which the piston 44A is imperforate but is smaller in diameter than the cylinder 43 so as to leave a clearance between the rim of the piston 44A and the interior wall of the cylinder 43. Surrounding piston rod 45 is a depending tube 46 which substantially prevents spilling or leaking of fluid from the dashpot.

Fig. 2B shows the means for mounting the calibrating weight 240. The groove 23 is formed in a screw 20A which threads into a suitably threaded hole in the end of the screw 20. Screw 20A permits a variation to be made in the distance of groove 23 from pivot 17. The weight 240 may be mounted directly in groove 23 or may be located in a pan suspended from groove 23.

Method of operation

Any difference between the pressures in chambers 6 and 7 exerts a force on the primary beam and on the secondary beam which is balanced by the force exerted by the air in the balancing bellows 40.

When the differential pressure increases, diaphragm 8 moves upward. This motion rocks the primary beam about its fulcrum 17 and presses the rider 21 down against secondary beam 29. Secondary beam 29 rocks about its pivot 28 and moves closer to nozzle 35. This causes air pressure to build up inside rebalancing bellows 40 until the force exerted by bellows 40 just balances the force exerted by diaphragm 8. The air pressure then transmitted through port 39 is proportional to the differential pressure. This whole series of action is practically instantaneous and takes less than one second for 63.2 percent of full change with 15 feet of connected tubing. The device is pneumatically balanced with a minimum of net diaphragm and flapper displacements.

The relation between the differential pressure and the output air pressure can be altered by moving rider 21 along screws 20. This permits the span or range to be continuously adjusted from a minimum of 0–20 inches of water to a maximum of 0–200 inches of water. Moving rider 21 along screw 20 moves the point of contact and therefore the leverage between the primary and secondary beams so that, for example, a larger differential pressure can be made to create a relatively smaller force actuating on the pneumatic balancing bellows.

As has been stated, the zero adjustment is made by positioning the feedback bellows 40 with respect to the secondary beam 29 by means of wheel 41. This zero adjustment does not appreciably affect the span. An ample range of adjustment is provided. Neither adjustment requires special tools as the lock nuts are standard.

Groove 23 on the right end of screw 20 provides an exact point for hanging a calibration weight 240. Weight 240 creates a downward force on the pneumatic-balance linkage just as the differential pressure in the meter body does. A set of calibration weights 240 can thus serve as a very accurate and convenient method of meter calibration. The weight relationship is such that a one pound weight on the end of screw 20 is equivalent to a differential pressure of 10 inches of water. For example, full scale transmitted air pressure (15 pounds per square inch (p. s. i.)) for a differential pressure equal to 100 inches of water would require a 10 pound weight. At 50 percent of scale and 9 p. s. i. of transmitted pressure this range should correspond to 50 inches of water and would require a five pound weight, and so on. No curves or tables are required to calibrate the meter in the field. The same standard weights can be used in the field for all these meters. The above example is only true for one fixed position of moving rider 21. Other examples for other fixed positions of moving rider 21 may be used, if desired.

The diaphragm and beam range is protected against overload or reverse flow because under such conditions the flexible diaphragm 8 is pressed against the walls of chamber 6 or chamber 7 and is not damaged. In case of overload the primary beam rotates about its fulcrum 17 so that the pivot 28 of secondary 29 compresses spring 26 and no damage is done to the linkage. In the case of reverse flow or over-range on the low pressure chamber 6 the primary beam rotates counterclockwise about its fulcrum 17 and no damage can result to the beam linkage.

Figures 3 and 4

These figures show bracket 300 by means of which the instrument may be supported. Bracket 300 is a modification of support 1 shown in Fig. 1. This bracket 300 has two upstanding arms 301 and 302. These arms are perforated near their tops or upper ends with holes which match the perforations in plate 1. Bolts 304 have hexagonal heads 305 and are adapted to receive fastening nuts 306. These holes in bracket 300 match the holes in plate 1. Bolts 304 pass through these holes and thus secure the instrument on bracket 300.

At its base or lower end bracket 300 has a ring-shaped portion 307 through which passes a screw 308 having hexagonal head 309. Screw 308 serves to fasten bracket 300 to the upper end of a pipe stand or other support 310.

If desired pipe stand 310 may have screw threads 311 on its upper end which match with screw threads on the ring 307.

Structure for adjustment of sealing bellows

Sealing bellows 18 is subjected, on its outer surface, to the high pressure within chamber 7, and, on its inner surface, to the low atmospheric pressure surrounding the meter body. This static pressure may introduce an error in the meter readings, if the thrust, which the static pressure produces on the sealing bellows 18 does not pass exactly through the axis of the pivots 17 for the primary beam. In order to insure that this thrust does pass exactly through this axis, the primary beam may be rocked about its pivotal axis until this pivotal axis and this thrust axis intersect.

Figure 9:
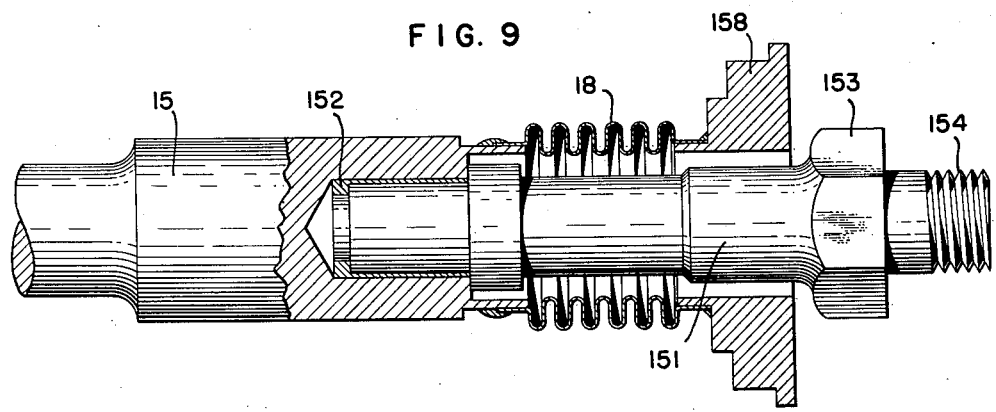
Fig. 9 is a side elevation on an enlarged scale with parts broken away in longitudinal cross section showing the sealing bellows for the primary beam.

Fig. 9 shows that the primary beam includes element 15 to which is attached section 151 by means of silver solder 152. Section 151 has a hexagonal portion 153 adjacent screw-threaded end 154. Fig. 1 shows nut 155 which threads on screws 154 to attach section 151 to yoke 19 to form parts of the primary beam.

Figs. 1 and 5 show meter body part 5 extending to the right beyond pivots 17. Screws 156 hold ring 157, through the center of which the primary beam passes freely, tightly against the right face of ring 158 and thus clamp ring 158 against the right end of body section 5. Fig. 9 shows that ring 158, which is thus held stationary, supports the right end of sealing bellows 18. The left end of sealing bellows 18 is secured to element 15 of the primary beam and moves with it about pivot 17 as an axis.

Figure 8:
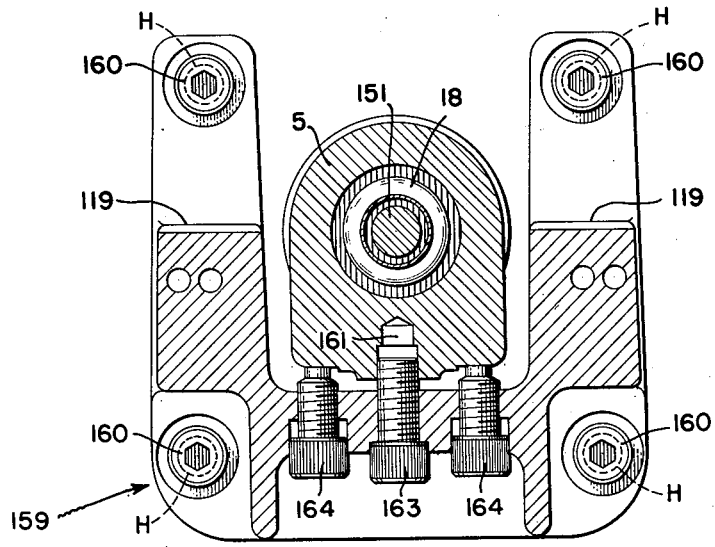
Fig. 8 is a transverse, vertical cross section on an enlarged scale on line 8—8 of Fig. 1 viewed in the direction of the arrows.

Figs. 1, 5, and 8 show, at the right of plate 1, a substantially U-shaped bracket, generally indicated by the reference character 159. Bracket 159 is clamped against plate 1 by means of four screws 160 which pass into the end of body part 5 through holes H in plate 1, which holes are slightly larger in diameter than screws 160. Bracket 159 has two horizontal surfaces 119 to which the horizontal strips, which combine with vertical strips to form the pivots 17, are attached by screws 120 (Fig. 6).

Fig. 8 shows that body section 5 has a screw-threaded hole 161 in its bottom in which threads a central adjusting screw 163 flanked on either side by an adjusting screw 164. The upper ends of screws 164 do not thread into body part 5 but have flat faces which abut body part 5.

*Method of adjustment of sealing bellows*

Screws 160 are loosened slightly to unclamp plate 1 and thus permit very slight, vertical movement between body portion 5 and U-shaped bracket 159 because the holes in plate 1 are slightly larger than the diameter of the stem of each screw 160.

If the vertical relation between body part 5 and U-shaped bracket 159 is to be increased, adjusting screw 163 is rotated so as to cause bracket 159 to move vertically upward relative to part 5. Adjusting screws 164 are then tightened equally on each side, to avoid rocking U-shaped bracket 159 about the longitudinal axis of the primary beam, until part 5 and bracket 159 are locked in their adjusted position.

If the vertical relation between part 5 and bracket 159 is to be decreased, adjusting screws 164 are first backed off so that their flat ends disengage part 5. Screw 163 is then turned to draw part 5 and bracket 159 together in a vertical direction. The screw 163 and screws 164 cooperate to lock part 5 and bracket 159 in this adjusted position.

In either of the above cases, adjustment of screws 163 and 164 and the pressure of spring 26 on secondary beam 29 and hence on ring 21 causes the primary beam to be translated upward or downward as a whole and thus move the left end of bellows 18 until the axis of the thrust on bellows 18, due to the differential static pressure thereon, intersects the pivoted axis 17 of the primary beam.

While, in accordance with the provisions of the statutes, we have illustrated and described the best form of the invention now known to use, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is as follows:

1. A meter for measuring pressure, including, a first meter body part having in it a chamber for receiving the pressure to be measured, an element movable relative to said chamber in response to the pressure therein, a primary beam having one end in said chamber and the other end outside of said chamber, a link connecting said element to the one end of said primary beam in said chamber, a flexible sealing bellows encircling said primary beam and forming a wall of said chamber subject to a static differential pressure causing a thrust on said primary beam along a thrust axis parallel to its longitudinal axis, a second meter body part located outside of said chamber, two pairs of flexible strips (the strips of each pair being at an angle to each other) forming pivots providing a pivotal axis transverse to said primary beam about which pivotal axis said primary beam tends to be rotated by said element, one of the ends of each of said flexible strips being mounted on said second meter body part and the other end of each of said flexible strips being secured to said primary beam, attaching screws attachably and detachably securing said first and said second meter body parts together, and an adjusting screw operable (when said attaching screws are loose) to adjust said first and said second meter body parts relative to each other in a direction transverse to said pivotal axis and to said thrust axis to cause said pivotal axis and said thrust axis to intersect.

2. A meter for measuring pressure, including, a first meter body part forming a base and having a vertical face and having in said body part a chamber for receiving the pressure to be measured, an element movable relative to said body part in response to changes in the pressure in said chamber, a primary beam having one end in said chamber and the other end outside of said chamber, a link connecting said element to the one end of said primary beam in said chamber, a flexible sealing bellows secured at one end to said primary beam and secured at the other end to said first meter body part and forming a wall of said chamber subject to a static differential pressure causing a thrust on said primary beam along a thrust axis parallel to its longitudinal axis, a second meter body part outside of said chamber and having a vertical face parallel to the vertical face of said first body part, two pairs of flexible strips (the strips of each pair being at an angle to each other) forming pivots providing a pivotal axis transverse to said primary beam, about which pivotal axis said primary beam tends to be rotated by said element, one of the ends of each of said flexible strips being mounted on said second meter body part and the other end of each of said flexible strips being secured to said primary beam, attaching screws attachable and detachably securing said first and second meter body part together with their vertical faces sealed to prevent the escape of pressure from said chamber, and an adjusting screw threaded in said first meter body part and engaging said second meter body part and rotatable so as to cause a lateral displacement of said flexible strips connected to said second meter body part and thereby to cause said pivotal axis and said thrust axis to intersect.

3. A meter according to claim 2 mounted on a support having a flat, vertically extending portion located between the vertical faces of said first and said second meter body parts and sealed therebetween and having a horizontal opening through it, a portion of said first meter body part and a portion of said primary beam extending through said opening.

4. A meter according to claim 2 having at least one additional adjusting screw threaded in said second meter body part and engaging said primary beam and rotatable (when said attaching screws are loose) to lock said primary beam in the position to which it has been adjusted by said first mentioned adjusting screw.

References Cited in the file of this patent
UNITED STATES PATENTS

Re. 17,652    Neebe _____ Apr. 29, 1930
182,202    Keyes _____ Sept. 12, 1876

(Other references on following page)

UNITED STATES PATENTS

| | | |
|---|---|---|
| 1,650,736 | Zelov | Nov. 29, 1927 |
| 2,296,487 | Alfred | Sept. 22, 1942 |
| 2,365,573 | McGay | Dec. 19, 1944 |
| 2,405,979 | Rosenberger | Aug. 20, 1946 |
| 2,409,435 | Ketay et al. | Oct. 15, 1946 |
| 2,431,200 | Rosenberger | Nov. 18, 1947 |
| 2,446,385 | Newell | Aug. 3, 1948 |
| 2,454,946 | Rosenberger | Nov. 30, 1948 |
| 2,459,542 | Rosenberger | Jan. 18, 1949 |
| 2,536,198 | Matner et al. | Jan. 2, 1951 |
| 2,612,908 | Tate et al. | Oct. 7, 1952 |
| 2,626,626 | Rosenberger et al. | Jan. 27, 1953 |
| 2,658,392 | Vannah | Nov. 10, 1953 |

FOREIGN PATENTS

| | | |
|---|---|---|
| 13,413 | Great Britain | Aug. 6, 1903 |
| 669,829 | Germany | Jan. 28, 1939 |
| 562,645 | Great Britain | July 11, 1944 |

OTHER REFERENCES

Taylor Instrument Company's Leaflet #92,190, "Operating Instructions and Parts List for Taylor Pneumatic Transmitter, etc." (18 pages).

Republic Flow Meters Co. Data Book No. 1001. (Received in the Patent Office September 15, 1948 and available in Div. 36; p. 6 relied on and the reference referred to hereinafter solely as "Republic.")